Figure 1:
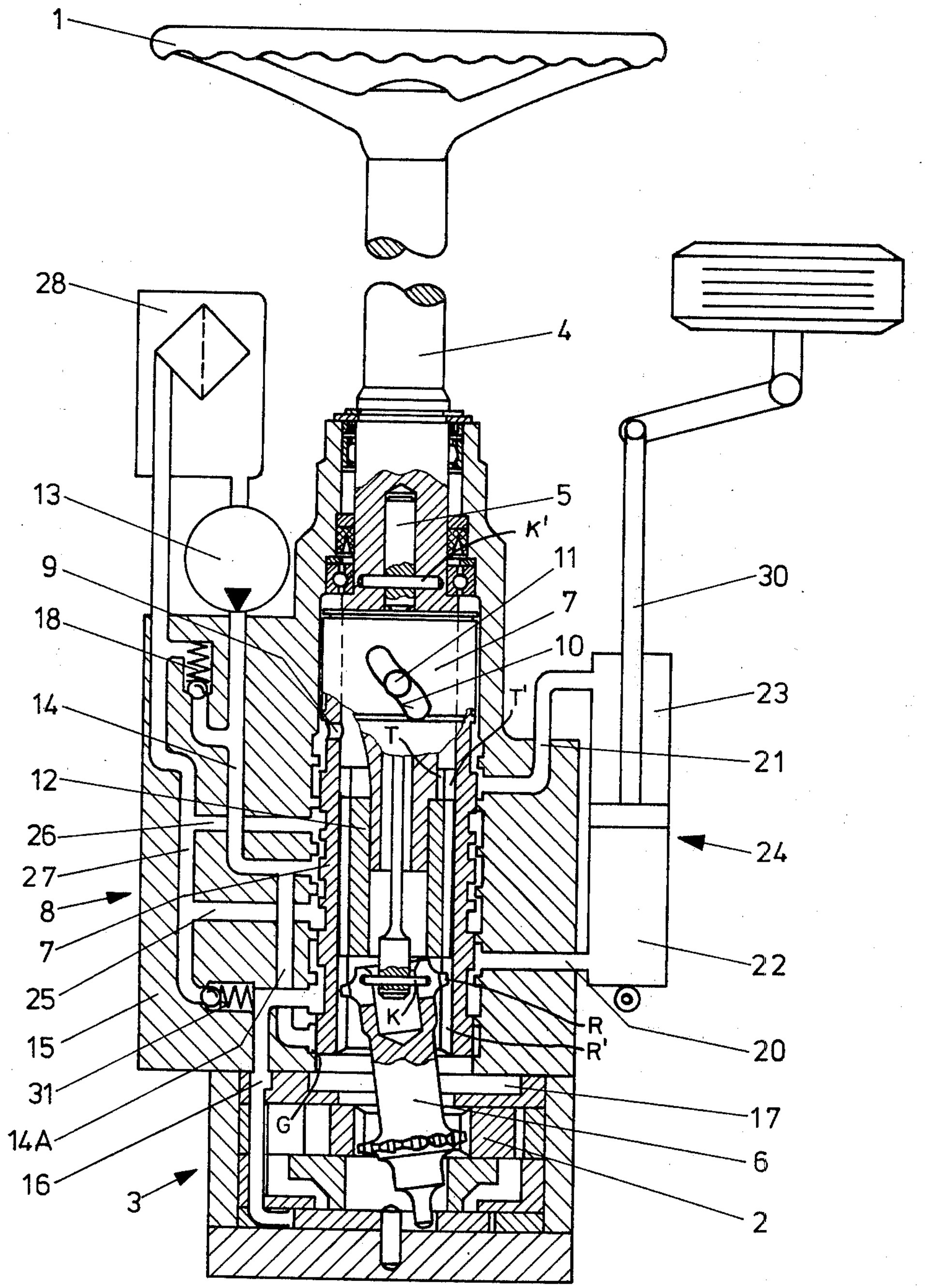

United States Patent [19]

Lang et al.

[11] 3,989,120

[45] Nov. 2, 1976

[54] POWER STEERING WITH VARIABLE VOLUME SERVO CONTROL

[75] Inventors: Armin Lang; Karl-Heinz Liebert, both of Schwabisch Gmuend, Germany

[73] Assignee: Zahnradfabrik Friedrichshafen AG, Friedrichshafen, Germany

[22] Filed: Apr. 22, 1975

[21] Appl. No.: 570,412

[30] Foreign Application Priority Data

Apr. 24, 1974 Germany ........................... 2419672

[52] U.S. Cl. ................................................ 180/154

[51] Int. Cl.² ........................................... B62D 5/06

[58] Field of Search ................. 180/79.2 R; 60/386, 60/384, 402; 418/61; 91/480

[56] References Cited

UNITED STATES PATENTS

| | | | |
|---|---|---|---|
| 2,808,120 | 10/1957 | Hunter | 180/79.2 R |
| 3,497,032 | 2/1970 | Schott | 180/79.2 R |
| 3,553,966 | 5/1969 | Liebert | 60/384 |
| 3,587,235 | 6/1971 | Goff et al. | 60/384 |
| 3,874,473 | 4/1975 | Grove | 180/79.2 R |

*Primary Examiner*—M. H. Wood, Jr.
*Assistant Examiner*—R. Schrecengost

[57] ABSTRACT

The invention provides a compact control valve for double acting steering system servomotors utilizing a housing and control valve therein with coacting lands and passage means effecting a transfer of fluid from one pressure chamber to the other of a single piston rod servomotor. Such transfer is in response to automatic straightening of the wheels of a vehicle by road contact after they have been turned to effect steering. In particular, since the servomotor pressure chambers are unequal in volume due to the bulk of the piston rod passing through only one chamber, some volume compensation for shunting of the fluid between chambers is required due to excess of fluid in going to the smaller volume chamber from the larger volume chamber, and deficit of fluid when transferring in the opposite direction. The problem is met in the first case by direct shunting through the control valve of the excess portion of fluid to a return passage in the housing; and in the second case by providing a suction operated check valve which opens to draw additional fluid from the return passage to provide for complete filling of the larger pressure chamber.

15 Claims, 2 Drawing Figures

POWER STEERING WITH VARIABLE VOLUME SERVO CONTROL

Briefly, the invention comprises an arrangement of a reciprocal valve sleeve biased to a neutral position by a torsion bar which, however, can be stressed by a steering spindle to rotate a metering pump while simultaneously reciprocating the valve sleeve so that the lands and grooves thereof coact with lands and grooves of a housing to pressurize and exhaust the pressure chambers of a double acting motor. All components of the invention are contained in a single housing and the particularly novel feature is the provision of means for permitting the exchange of fluid between the pressure chambers when the valve sleeve has returned to neutral position after effecting steering, so that the vehicle wheels can return to straight ahead position by road forces acting thereon.

Thus, the steering control functions of the valve sleeve and metering pump are generally conventional but a problem exists in the interchange of fluid between servomotor pressure chambers due to one chamber, the chamber having the piston rod, having a lesser volume than the other chamber. This inequality of quantities to be exchanged between the pressure chambers must be compensated for and the known prior art fails to solve the problem.

For example, the U.S. Pat. No. 2,020,951 in the neutral position of the control valve shows passages to the servomotor which are blocked after a turn. The wheels cannot return automatically and the vehicle driver receives no sense of road contact. When steering is accomplished without power assist the exhausting pressure chamber must feed back to the inlet side of the metering pump and, accordingly, equal pressure chambers are needed.

Another prior art arrangement is disclosed in German Pat. No. 1,297,992 but here again equal volume exchange of fluid between the servomotor pressure chambers is required for proper operation.

The present invention utilizes a construction comprising components of familiar construction and operation assembled in a single housing, and the additional components required to carry out the compensatory purposes of unequal volume transfer are extremely simple and readily incorporated in the valving and housing passage means. Accordingly, the improvement brought about is effected with a minimum of additional cost in a very novel manner. Thus, by providing a single valve aperture for diverting of excess fluid, when transfer is from the larger to the smaller volume servomotor pressure chamber most of the transfer fluid goes to fill the smaller pressure chamber. When transfer is from the smaller to larger volume chamber a suction operated check valve is incorporated in the passage means connecting to a return passage and the suction effected by servomotor piston movement due to deficiency of fluid transfer flow to the larger pressure chamber serves to open the check valve. Supplemental fluid then flows from the return passage to make up the volume difference.

Accordingly, the economy of using a single piston rod double acting servomotor is preserved.

Figure 2:
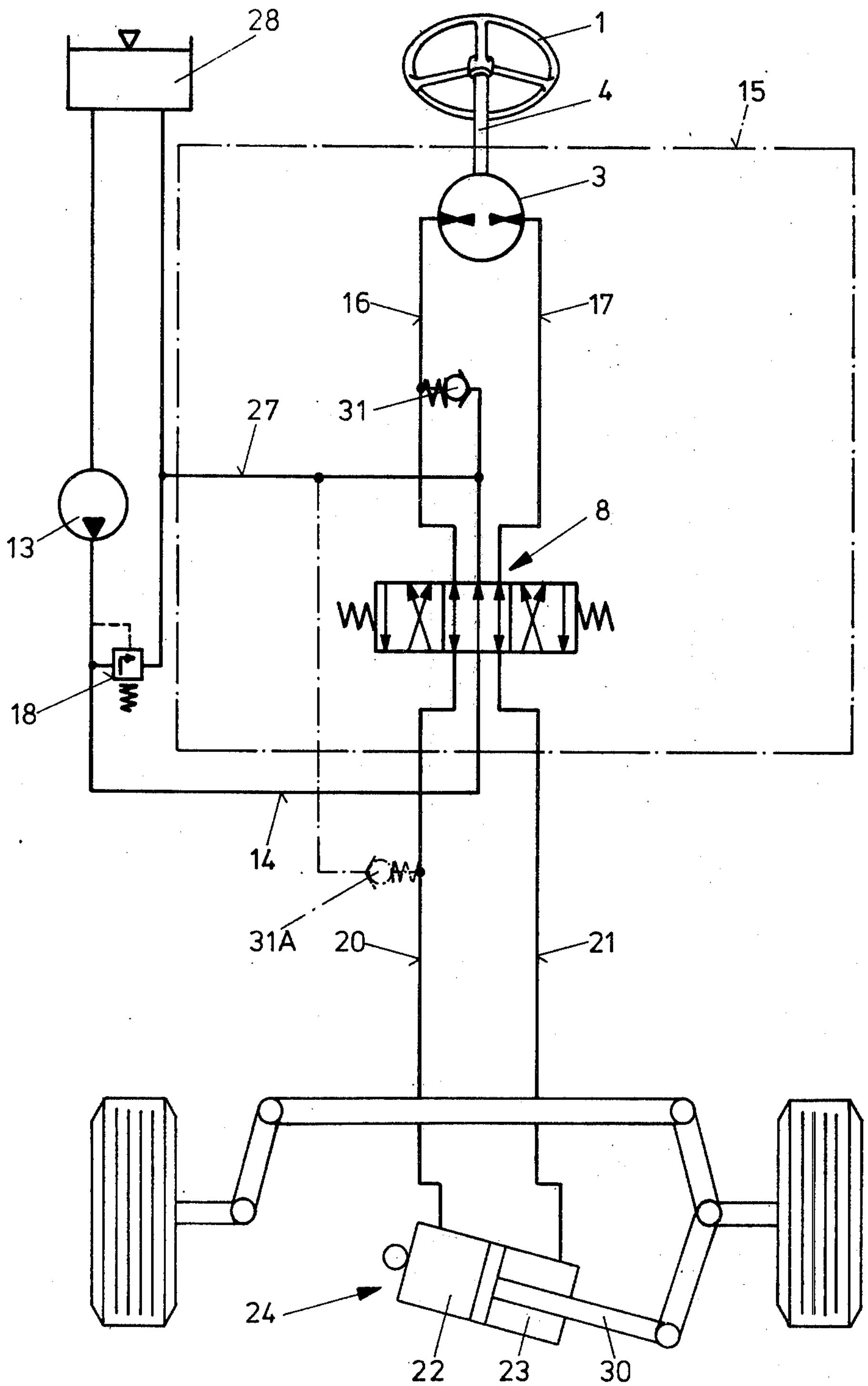

A detailed description now follows in conjunction with the appended drawing in which:

FIG. 1 shows a longitudinal cross section through a control valve housing showing all essential components of the invention, and FIG. 2 is a symbolic diagram of a generally conventional pressure control system to which the invention has been applied.

Referring to FIG. 1 there is disclosed a steering wheel 1 and the rotor 2 of a manually operated metering pump 3. Pump 3 is operated by the steering spindle 4 through a torsion bar 5 and pump nutatory motion drive shaft 6 having geared engagement with rotor 2 in a known manner. A valve sleeve 7 of a servomotor control valve 8 has a radial bore 9 and provides flow control for power steering in a manner to be described. It should be noted at this time that flow can take place interiorly of valve sleeve 7 to or from bore 9 for a purpose to be described despite the presence of mechanical components in the valve sleeve.

The torsion bar 5 is keyed as shown to the spindle 4 as by the pin K and to the drive shaft 6 as by the pin K′. The latter pin K′ is keyed in radial slots at the upper end of the drive shaft as shown.

A cam slot 10 is provided at the upper end of the valve sleeve 7 into which slot protrudes a cam pin 11 carried by the steering spindle 4 as by a force fit in a bore therein (not shown). Accordingly, rotation of the steering spindle 4 will effect, through the cam pin 11 and slot 10, reciprocation of the valve sleeve 7 in either direction, and will also effect rotation of metering pump rotor 2 through the torsion bar 5 while torque stressing that bar. The torque stress biases valve sleeve 7 to neutral position shown in FIG. 1.

The maximum angle of torsional twist between spindle 4, shaft 6 and valve sleeve 7 is limited by a sleeve 12 which serves as a lost motion coupling inside initially non-rotative valve sleeve 7 and is provided with a pair of teeth R which are diametrically opposed and engage teeth such as R′ disposed on the inner surface of valve sleeve 7. It will be understood that there is a pair of spaced teeth R′ for each tooth R so that rotation in either direction of drive shaft 6 is limited to the degree of spacing.

Additionally, sleeve 12 has teeth T engageable with teeth T′ on steering spindle 4 to provide for a certain amount of rotational play so that it is possible for valve sleeve 7 to rise slightly, as will be later explained, to open a gap at G without rotation of the steering wheel.

An engine operated servopump 13 provides steering booster pressure fluid to be fed via feed channels 14 or 14A in the housing 15, and via control valve 8 to respective pressure chambers 16 or 17 of metering pump 3 dependent on direction of steering by rotation of steering wheel 1. From either chamber 16 or 17 pressure fluid proceeds to the control valve 8 to be fed for directional steering control. The several lands and grooves of the valve sleeve 7 and housing 15 coact to effect control valve 8 for directional flow control, reference being made to FIG. 2, additional passage means as required being provided in the housing 15.

The operating pressure of servopump 13 is regulated to a maximum value by a pressure relief valve 18.

The metered flow output of pump 3 communicates via passage 20 or 21 under control of valve 8 dependent on the direction of steering through a respective pressure chamber 22 or 23 of servomotor 24.

Thus working pressure from either chamber 16 or 17 reaches a respective servomotor chamber 22 or 23 dependent on steering direction while exhaust from chambers 22 or 23 is effected pressurelessly via respective passage 20 or 21 under control of valve 8 to intermediate passages, respectively, 25 or 26 connecting with return passage 27 leading to tank 28.

It will be noted that the piston of the servomotor connects via a piston rod 30 through steering mechanism to the vehicle wheels, as generally indicated on FIG. 1. Inasmuch as the piston rod passes through only one chamber of the servomotor it is obvious that chamber 22 holds a larger volume of pressure fluid than chamber 23. In that connection, the bore 9 and a check valve 31 in housing 15 connecting chamber 16 and an open gap of the control valve 8 with exhaust or return passage 27 are instrumental in compensating for the inequality of fluid quantities to be shunted from chamber 22 to 23 and vice versa when the vehicle wheels are permitted to return to straight ahead automatically by road contact after a steering function.

The mechanical operating of the valve sleeve 7 by the steering wheel through the cam slot and cam pin is generally conventional, the torsion bar 5 serving to bias the valve sleeve for straight ahead steering position in a known manner and as heretofore mentioned.

With reference to FIGS. 1 and 2, more particularly, FIG. 1, valve sleeve 7 being in neutral position, oil under pressure from pump 13 flows by way of passage 14 via the open passage means noted between coacting lands and grooves of the housing 15 and valve sleeve 7 to passages 25 and 26 and thence via return passage 27 to tank 28. There is no other oil circulation in the system at this time.

The respective pressure chambers 22 and 23 of servomotor 24 connect via passages 20 and 21 to metering pump chambers 16 and 17 through open gaps intermediate of the valve sleeve and housing, as shown.

For the condition shown and described, transfer of fluid between the pressure chambers of the servopump can take place in either direction, through the metering pump, by road forces on the vehicle wheels, straightening them if steering has just taken place, steering wheel 1 having been brought back manually to straight ahead steering position.

In power steering assist, when steering wheel 1 is rotated, there is pressure in chambers 16 and 17 from pump 13 which can be directed for left or right steering, as apparent from FIG. 2, but such pressure acts to maintain check valve 31 closed. Valve 31 can open only when there is a pressure differential with lower pressure on the downstream side of the valve, as will be apparent.

In operating, assume that the vehicle wheels are in a turned position and the steering wheel and valve sleeve 7 are back to straight ahead steering position, and that the piston rod 30 is being moved upwardly as viewed on FIG. 1. By road reaction the vehicle wheels are straightening. The hydraulic fluid or oil from the smaller chamber 23 must transfer to the larger chamber 22. This flow occurs through the passage 21 and, due to the gaps provided by the position of valve sleeve 7 in the housing, between the housing and valve sleeve to the radial bore 9 and inwardly through the wall of the valve sleeve and thence downwardly through the interior of the valve sleeve to pressure chamber 17 of the metering pump 3. Such flow drives the rotor 2 whereby continuation of flow is had through the pump chamber 16 and thence through the gaps provided between the valve sleeve and housing and passage 20 to the larger pressure chamber 22. However, the quantity of oil leaving smaller pressure chamber 23 is insufficient to fill larger pressure chamber 22. Accordingly, the servomotor piston moving upwardly creates a suction and thus a pressure drop at the downstream side of check valve 31. This pressure gradient causes the check valve 31 to open thus sucking oil via return passage 27 from tank 28. Accordingly the deficiency in oil for filling pressure chamber 22 is made up.

When the vehicle wheels are automatically returning from the opposite direction, the piston of the servomotor moves downwardly as seen on FIG. 1, or to the left as seen on FIG. 2, and the transfer of oil must then be from larger pressure chamber 22 to the smaller pressure chamber 23. In that case there is an excess of oil. The invention compensates for such excess mechanically due to the flow of the oil through the rotor 2 of the metering pump causing a relative rotation with respect to the steering spindle 4.

The rotor rotation produced by the flow is increased by the excess oil flow. Due to the mass of the steering wheel 1 and steering spindle 4 inertia prevents their rotation. The effect is to produce a slight camming action by virtue of the aforesaid play of the valve sleeve 7, which rotating slightly with slot 10, causes a slight upward movement of pin 11 and of the valve sleeve 7 thereby opening only a gap G, at the lowermost end of the valve sleeve.

Thus, oil for transfer from pressure chamber 22 to pressure chamber 23 is via passage 20 through chamber 16, through rotor 2 driving that rotor as explained above, and thence to the chamber 17 whence a small portion flows through the gap at G via the lowermost groove in the housing connecting with passage 14A and passage 14 into the intermediate passages 25 and 26. Oil then flows to return passage 27 and thence to tank 28.

It should be noted that in this slight movement of the valve sleeve 7 affording the opening at G there is no closing of flow control edges of lands or grooves between the valve sleeve and the housing fed from passages 20 and 14.

The larger portion of the divided oil flow of passage 20 from chamber 17 flows upwardly inside the valve sleeve 7 to pass outwardly through the radial bore 9 and thence to the passage 21 from whence it flows to pressure chamber 23.

Accordingly, from the above description it will be apparent that even though the servomotor pressure chambers hold unequal volumes of pressure fluid, transfer of fluid therebetween can be made in either direction with compensation for any quantity whether it be a deficiency or an excess. It will, of course, be noted that where the servomotor piston is moving downwardly so as to provide for an excess of oil the flow is against the opening direction of check valve 31 which, of course, remains closed during this particular function of the invention.

It will also be noted that although the check valve 31 is shown as being between passages 16 and 27 it could be located elsewhere. Thus if piston rod 30 were to come out of the opposite end of the cylinder as compared with FIG. 1, the check valve 31 would be connected between pressure chamber 17 and return passage 27. Also, such check valve could be inserted between passage 20 and return passage 27.

What is claimed is:

1. In a servomotor valve arrangement for operation of a double acting servomotor having a larger and smaller pressure chamber for vehicle wheel steering;

a housing having movable valve means;

manually operable steering means coupled to said movable valve means for actuation thereof upon operation of said steering means;

a metering pump having a rotor and drive means coupled for rotation by said steering means;

said housing and said valve means having coacting valving passages to effect pressure and exhaust flow control of servomotor pressure by actuation of said valve means;

passage means including said coacting housing and valve means having valving passages for effecting transfer of fluid between said pressure chambers and through said metering pump rotor when said servomotor is being returned automatically to a neutral position from a steering position by road contact of the wheels of a vehicle with said manually operable steering means in neutral position and said valve means in a neutral position;

an exhaust passage in said passage means and a check valve therein, biased to close against the direction of exhaust flow therethrough;

said exhaust passage being connected to pressure chambers of said servomotor at the upstream side of said check valve in the neutral position of said valve means whereby said check valve is opened by a drop in pressure when said larger pressure chamber is being filled by transfer of flow from said smaller pressure chamber to supplement flow from said exhaust passage to said larger pressure chamber.

2. In a servomotor control valve arrangement as set forth in claim 1, said check valve being connected between a side of said metering pump and said exhaust passage.

3. In a servomotor control valve arrangement as set forth in claim 1, said check valve being within said housing.

4. In a servomotor control valve arrangement as set forth in claim 1, said check valve being connected between a side of said metering pump and said exhaust passage; and said check valve being within said housing.

5. In a servomotor control valve arrangement as set forth in claim 1, said passage means comprising respective passages for the pressure chambers of said servomotor and said check valve being connected to one of said passages.

6. In a servomotor control valve arrangement as set forth in claim 1, said movable valve means comprising a valve sleeve having a bore through a wall thereof and said bore being comprised in said passage means; the interior of said valve sleeve communicating with said bore and being comprised in said passage means.

7. In a control valve arrangement as set forth in claim 1, said steering means being coupled to said valve means by a cam means intermediate said manually operable steering means and said movable valve means for actuation thereof;

said housing and valve means having an additional valving passage effected by coaction therebetween and openable by lesser valve means movement than required to render said first mentioned valving passages operable for pressure chamber flow control;

said metering pump rotor being driven by transfer flow therethrough from the larger to the smaller pressure chamber of said servomotor operative to actuate said cam means to effect valve means actuation effecting flow of a portion of said transfer flow to said exhaust passage through said additional valving passage;

the remainder of said flow transferring through said passage means to said smaller pressure chamber of said servomotor.

8. In a servomotor control valve arrangement as set forth in claim 7, said valve means comprising a valve sleeve having a bore through a wall thereof and said passage means comprising said bore and the interior of said valve sleeve communicating therewith.

9. In a servomotor control valve arrangement as set forth in claim 8, means providing predetermined play between said steering means and said valve means;

said steering means having a mass providing predetermined inertia, whereby actuation of said cam means by said rotor is ineffective to rotate said steering means from a neutral position.

10. In a servomotor control valve arrangement for operation of a double acting servomotor having a larger and smaller pressure chamber for vehicle wheel steering;

a housing having movable valve means therein;

said valve means having a neutral position wherein normal pressure and exhaust flow to said servomotor is blocked in said neutral position;

manually operable steering means coupled to said valve means for actuation thereof upon operation of said steering means;

a metering pump having a rotor and drive means coupled thereto for rotation by said steering means;

said housing and said valve means having coacting passages to permit or block said normal pressure and exhaust flow for control of said servomotor responsive to rotation of said steering means;

said housing and movable valve means having additional coacting valve passages for effecting transfer of fluid between said pressure chambers of said servomotor through said metering pump when said movable valve means is in neutral position while said servomotor is being returned automatically to a straight ahead steering position after a steering operation by road contact acting on the vehicle wheels;

a chamber in said housing communicating with a side of said metering pump;

a check valve communicating with said chamber and biased to closed position but openable by pressure drop in said chamber;

oil source means communicating upstream with said check valve wherein opening of said check valve effects communication between said chamber and said oil source;

said chamber being connected to the larger pressure chamber of said servomotor via said additional coacting valve passages in neutral position of said valve means whereby said check valve is opened by a drop in pressure on the downstream side thereof in said chamber when said larger pressure chamber is being filled by transfer of flow from said smaller pressure chamber to provide supplemental flow from said source to said larger pressure chamber.

11. In a servomotor control valve arrangement as set forth in claim 10, said steering means being coupled to said valve means by a cam means intermediate said manually operable steering means and said movable valve means for actuation thereof;

said housing and valve means having a valving passage effected by coaction therebetween and openable by lesser valve means movement than required to render said first mentioned valving passages operable for pressure chamber flow control;

said metering pump rotor being driven by transfer flow therethrough from the larger to the smaller pressure chamber of said servomotor operative to actuate said cam means to effect valve means actuation effecting flow of a portion of said transfer flow to said oil source through said valving passage;

the remainder of said flow transferring through said passage means to said smaller pressure chamber of said servomotor.

12. In a servomotor control valve arrangement as set forth in claim 10, said movable valve means comprising a valve sleeve having a bore through a wall thereof and said bore being comprised in said passage means;

the interior of said valve sleeve communicating with said bore and being comprised in said passage means.

13. In a servomotor control valve arrangement as set forth in claim 11, means providing predetermined play between said steering means and said valve means;

said steering means having a mass providing predetermined inertia, whereby actuation of said cam means by said rotor is ineffective to rotate said steering means from a neutral position.

14. In a servomotor control valve arrangement as set forth in claim 11, said movable valve means comprising a valve sleeve having a bore through a wall thereof and said bore being comprised in said passage means;

the interior of said valve sleeve communicating with said bore and being comprised for reversible fluid transfer in said passage means;

means providing predetermined play between said steering means and said valve means;

said steering means having a mass providing predetermined inertia, whereby actuation of said cam means by said rotor is ineffective to rotate said steering means from a neutral position.

15. In a servomotor control valve arrangement as set forth in claim 11, said movable valve means comprising a valve sleeve having a bore through a wall thereof;

the interior of said valve sleeve communicating with said bore and being comprised therewith in said passage means for reversible fluid transfer;

means providing predetermined play between said steering means and said valve means comprising a lost motion coupling between said steering means and said valve sleeve;

said steering means having a mass providing predetermined inertia, whereby actuation of said cam means by said rotor is ineffective to rotate said steering means from a neutral position.

* * * * *

UNITED STATES PATENT OFFICE

CERTIFICATE OF CORRECTION

Patent No. 3,989,120 Dated November 2, 1976

Inventor(s) Armin Lang et al.

It is certified that error appears in the above-identified patent and that said Letters Patent are hereby corrected as shown below:

Column 4, line 26, "of", second occurrence, should read -- on --; the word "and" should be deleted.

In the drawing, Fig. 1, the lead line from "R" should terminate on the tooth of Sleeve 12.

Signed and Sealed this

*Second* Day of *May 1978*

[SEAL]

*Attest:*

RUTH C. MASON
*Attesting Officer*

LUTRELLE F. PARKER
*Acting Commissioner of Patents and Trademarks*